(12) United States Patent
Feldman

(10) Patent No.: US 7,379,187 B2
(45) Date of Patent: May 27, 2008

(54) DETECTOR CONFIGURATION FOR INTERFEROMETRIC DISTANCE MEASUREMENT

(75) Inventor: Mark Feldman, Redmond, WA (US)

(73) Assignee: Mitutoyo Corporation, Kawasaki (JP)

( * ) Notice: Subject to any disclaimer, the term of this patent is extended or adjusted under 35 U.S.C. 154(b) by 111 days.

(21) Appl. No.: 11/393,852

(22) Filed: Mar. 31, 2006

(65) Prior Publication Data

US 2007/0229841 A1 Oct. 4, 2007

(51) Int. Cl.
*G01B 9/02* (2006.01)
(52) U.S. Cl. .................................................... 356/493
(58) Field of Classification Search ................ 356/484, 356/487, 491–495
See application file for complete search history.

(56) References Cited

U.S. PATENT DOCUMENTS

| | | | | |
|---|---|---|---|---|
| 3,634,682 A | * | 1/1972 | Gold | 250/548 |
| 5,189,489 A | * | 2/1993 | Brunfeld | 356/493 |
| 5,374,991 A | * | 12/1994 | Atkinson et al. | 356/493 |
| 5,883,717 A | * | 3/1999 | DiMarzio et al. | 356/491 |
| 5,949,546 A | * | 9/1999 | Lee et al. | 356/492 |
| 5,999,261 A | * | 12/1999 | Pressesky et al. | 356/487 |
| 6,020,963 A | * | 2/2000 | DiMarzio | 356/491 |
| 6,181,420 B1 | * | 1/2001 | Badami et al. | 356/487 |
| 6,906,315 B2 | | 6/2005 | Tobiason | |
| 6,961,130 B2 | * | 11/2005 | Law et al. | 356/493 |

* cited by examiner

*Primary Examiner*—Patrick Connolly
*Assistant Examiner*—Scott M Richey
(74) *Attorney, Agent, or Firm*—Oliff & Berridge, PLC

(57) ABSTRACT

A phase difference detector generates a plurality of signals from an input beam including orthogonal, linearly polarized object and reference beam components. The detector may be configured such that as the reference and object beam components traverse the detector, phase shifts due to surface interactions are made as similar as possible between the s-components of the reference object beams, and between the p-components of the reference and object beams. Various outputs may be formed by interfering p-components exclusively, or s-components exclusively, negating errors that may otherwise arise due to differential phase shifts between p- and s-components. Phase-shifting elements in the detector may receive beams from beam splitting surfaces where the transmissive differential phase shift between p- and s-components is adjusted to insignificance.

23 Claims, 8 Drawing Sheets

DETECTOR CONFIGURATION FOR INTERFEROMETRIC DISTANCE MEASUREMENT

BACKGROUND OF THE INVENTION

1. Field of Invention

This invention is directed to detectors for interferometric distance measuring and surface profiling devices.

2. Description of Related Art

Laser interferometers are widely used to measure distances or displacements. One type, polarization interferometers, may form an output beam having two orthogonal, linearly polarized components—a reference beam component and an object beam component. The desired distance or displacement measuring information is carried by the phase difference between the orthogonal, linearly polarized reference and object components of the combined output beam.

Numerous schemes have been devised for measuring this phase difference. In one common scheme, a quadrature-type phase difference detector is used. Quadrature-type phase difference detectors typically divide the combined output beam from the interferometer into multiple beams, typically four beams, and intentionally introduce a different additional phase difference along each beam path. Ideally, the signal derived from each respective beam path corresponds precisely to the phase difference present at the output of the interferometer, plus the additional phase difference introduced along that beam path. The multiple signals are then processed based on trigonometric relationships that are specific to the various intentionally introduced phase differences, in order to determine the phase difference present at the output of the interferometer.

The terms light and radiation are used interchangeably herein. "Light" is not restricted to visible radiation. When used with reference to the operation of a detector, the term input beam generally refers to the orthogonal, linearly polarized reference and object components of an interferometric measurement beam as they encounter the first beam splitting surface of a detector. For example, an interferometric measurement beam output from an interferometer may be rotated by a half wave plate or the like that may be fixed to the detector in front of the first beam splitting surface. In such a case, the input beam is considered to be the interferometric measurement beam after it is rotated by the half wave plate, or the like, as it is presented to the first beam splitting surface of the detector.

The resolution and/or accuracy of a polarization interferometer is often limited by the ability of the phase difference detector, also referred to simply as a detector herein, to generate one or more measurement signals which are truly related only to the phase difference between the object and reference beams output from the interferometer. Conventional configurations of the quadrature-type detectors outlined above typically introduce unwanted "differential phase shifts" between the reference and object beam components that interfere to form the various output signals. In some applications, the measurement errors associated with these differential phase shifts are insignificant and/or unrecognized, and they are ignored. In other applications, "lumped" errors are compensated by special calibrations or adjustments and/or signal processing operations, without considering the root causes of the errors. In any case, such errors may adversely affect the accuracy, complexity, and/or reliability of a detector used for phase difference measurements.

The present invention is directed to a polarization interferometer phase difference detector that uses a novel component configuration and orientation to advance the achievable phase difference measurement accuracy. It should be appreciated that phase difference measurement is already a refined art, and that even small improvements are valued for extending the accuracy and/or reliability of the most accurate measurement technology that is widely available (interferometry). The phase difference measurement is ultimately used to provide a measuring resolution and/or accuracy finer than the basic wavelength of radiation used in the interferometer. For this reason, the degree of meaningful measurement resolution supported by a detector is sometimes referred to as the "interpolation level". Interpolation levels on the order of $1/100$ of a wavelength are not uncommon. A detector according to this invention may provide meaningful interpolation well beyond this level, on the order of $1/1000$ of a wavelength, for example.

As previously indicated, conventional detector arrangements typically include errors that arise because, in practice, conventional detectors may introduce unwanted differential phase shifts between the reference and object beam components that interfere to form the various output signals. Such differential phase shifts may directly alter signal amplitudes and the apparent phase difference between the interfering components of the reference and object beams in the outputs. They may also contribute to errors that alter the ideal phase relationships between the various outputs of the detector. In a quadrature-type detector, such phase relationship errors are referred to as "orthogonality errors."Orthogonality errors arise from the output signals having a phase relationship other than the expected 0, 90, 180 and 270 degree relationships, as assumed in various signal processing operations described below.

In conventional detectors, beamsplitter surfaces and/or coatings may generally be a source of differential phase shifts between the p and s polarization components of the beams with which they interact. We denote the p-s phase shift difference (the induced differential phase shift) in transmission as $$\Delta^T_{P-S} = \delta^T_P - \delta^T_S \quad (1)$$

and the differential phase shift in reflection as $$\Delta^R_{P-S} = \delta^R_P - \delta^R_S \quad (2)$$

where $\delta^T_P$, $\delta^T_S$, $\delta^R_P$, and $\delta^R_S$ are the beamsplitter coating/surface induced phase shifts for the p and s components in transmission and reflection respectively. It is generally difficult and/or prohibitively expensive to fabricate beamsplitter coatings that simultaneously control both of transmissive and reflective differential phase shifts as well as the desired ratio between the transmitted and reflected beam intensities.

According to one feature of this invention, it is not necessary to control both the transmissive and reflective differential phase shifts at each beam splitting surface in a detector, in order to eliminate their potential error contributions. Rather, components, surface orientations, and beam polarization directions are arranged such that as the reference beam and object beam components traverse various surfaces and/or coatings, induced phase shifts due to the surface and/or coatings interactions are made to be as similar as possible between the s-components of both the reference beam and object beam, and various output signals are formed by mixing these s-components exclusively. Similarly, surface and/or coatings interactions are made to be as similar as possible between the p-components of both the reference beam and object beam, and various output signals are formed by mixing these p-components exclusively.

Thus, the majority of phase shifts induced at the various surfaces and/or coating in a detector according to this invention are arranged to be "common mode" phase shifts in the interference signals that are output from the detector. Such common mode phase shifts do not contribute a net error in the phase difference represented in the interference signals, resulting in a more accurate measurement of the phase difference between the reference beam and object beam components. The resulting improvements in accuracy are important when attempting to increase the measurement resolution and accuracy of an interferometer to smaller fractions of a wavelength of light. In addition, the reduction and/or elimination of differential phase shifts within a detector is achieved in a particularly robust, simple and cost-effective manner in various embodiments according to this invention.

However, despite the foregoing feature of the invention, in the absence of additional care, errors may still arise in association with phase-shifting elements used in a detector. For example, quadrature-type detectors generally include quarter wave elements to introduce a 90 degree phase shift between the object and reference beams along one optical path through the detector. In general, without special care, there may be a differential phase shift $\Delta^T_{P-S}$, or $\Delta^R_{P-S}$, between the p and s components of the object and reference beams at a beam splitting surface before they reach such a phase-shifting element. Such differential phase shifts, in effect, make the reference and object beams elliptically polarized. Therefore, in general, phase error components will be present along orthogonal polarization directions in the beam(s) transmitted by the phase-shifting element. In such a case, the resulting interference signals used for determining a phase difference will not be the ideal signals desired.

According to a separate feature of the invention, if a phase shifting element is located to receive light transmitted by a beam splitting surface, then it is sufficient if $\Delta^T_{P-S}$ is adjusted to be insignificant before the transmitted light reaches the phase shifting element. Similarly, if a phase shifting element is located to receive light reflected by a beam splitting surface, then it is sufficient if $\Delta^R_{P-S}$ is adjusted to be insignificant. This overcomes the previously indicated difficulty of simultaneously controlling both $\Delta^T_{P-S}$ and $\Delta^R_{P-S}$, and makes it practical to provide the desired adjustment of $\Delta^T_{P-S}$ or $\Delta^R_{P-S}$, as well as providing a desired intensity splitting ratio, in a beam spitting coating. In some embodiments, the beam splitter surface coating may also include component layers that provide the phase-shifting element.

In general, in conventional beam splitter coatings, $\Delta^R_{P-S}$ may be significantly larger than $\Delta^T_{P-S}$. Therefore, while adjusting $\Delta^R_{P-S}$ may be a practical alternative, it may be more reliable and less expensive to adjust $\Delta^T_{P-S}$ to an insignificant level using a beam splitting coating. Accordingly, a detector may be configured such that all phase shifting elements receive beams transmitted at beam splitting surfaces where $\Delta^T_{P-S}$ is adjusted to insignificance. Errors that may otherwise arise due to uncontrolled $\Delta^R_{P-S}$ may then be negated by other previously described features of the invention.

Alternatively to providing a differential phase-shift compensating element integrated with a beam splitter surface coating, a differential phase-shift compensating element may be positioned along a path after a conventional beam splitting surface and before the phase-shifting element that provides the desired phase shift between the reference and object beams. The differential phase-shift compensating element has a design and orientation that compensates for any differential phase shift at the conventional beam splitting surface. It outputs orthogonal, linearly polarized reference and object beams to the following phase-shift element.

These and other features and advantages are described in, or are apparent from, the following detailed description.

BRIEF DESCRIPTION OF THE DRAWINGS

Various details are described below with reference to the following figures, wherein.

DETAILED DESCRIPTION

Figure 1:
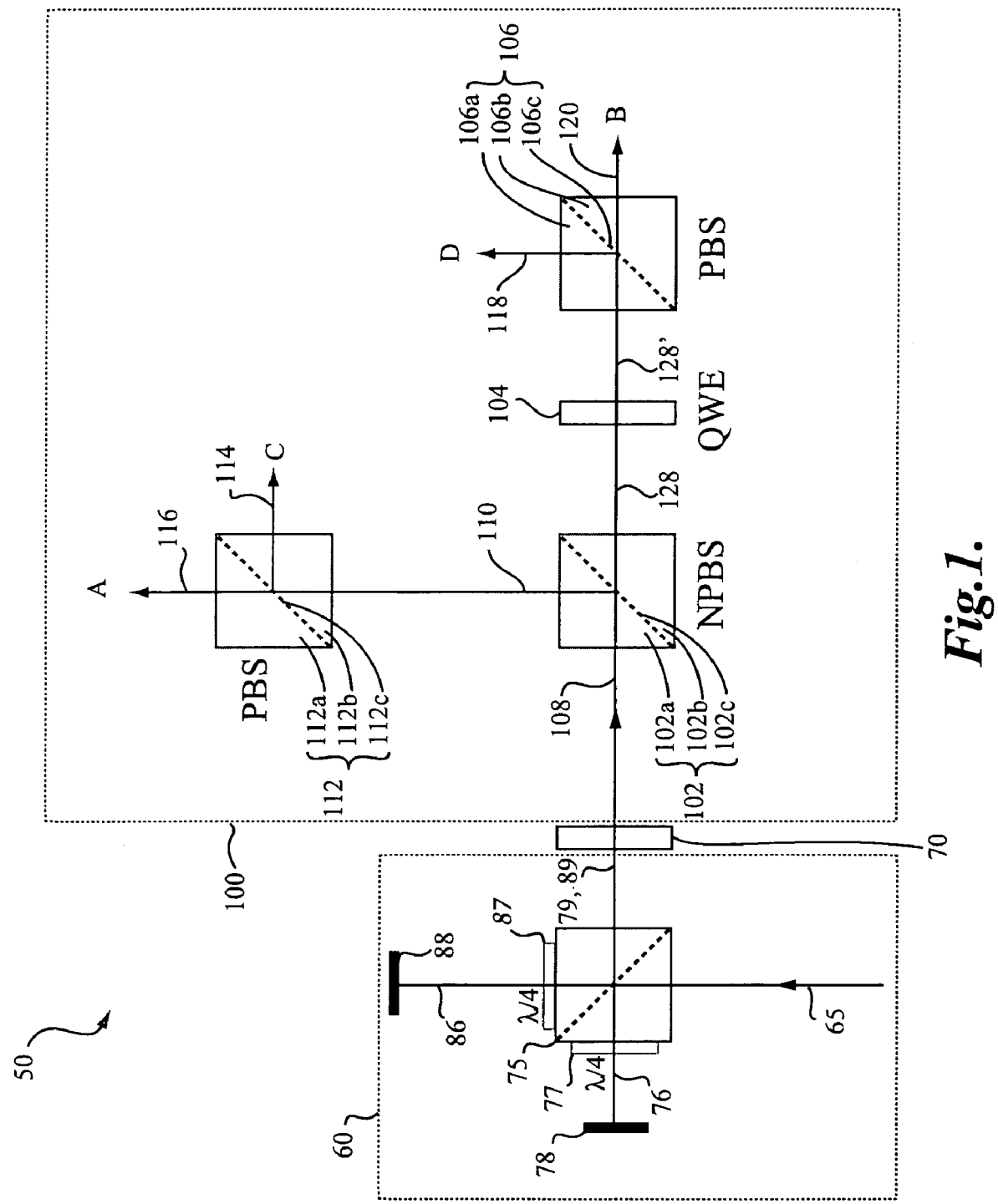
FIG. 1 illustrates an interferometer and a first exemplary quadrature-type detector.

FIG. 1 shows a schematic diagram of an exemplary interferometric distance measuring apparatus 50, including an interferometer portion 60 and a detector 100. In the interferometer portion 60, a laser source (not shown) may be used to generate coherent radiation 65. The radiation 65 may pass through appropriate components (not shown) to adjust the polarization of the radiation 65 as desired, and it is then incident on a polarizing beam splitter 75, which may transmit the portion of the radiation 65 that is "p" polarized to form reference beam 86, and reflect the portion of the radiation that is "s" polarized to form object beam 76. The reference beam 86 is transmitted through a quarter wave plate 87 to a fixed reference mirror 88 and reflected back through the quarter wave plate 87 to reach the polarizing beam splitter 75. Its polarization is now rotated 90° relative to its initial transmission through the polarizing beamsplitter 75. Thus, it is reflected by the polarizing beam splitter 75 to form the output reference beam 89, which becomes one orthogonal, linearly polarized component of a combined input beam 108.

Similarly, object beam 76 is transmitted through a quarter wave plate 77 and reflected from the movable object surface 78 back through the quarter wave plate 77 to reach the polarizing beam splitter 75. Its polarization is now rotated 90° relative its initial reflection from the beamsplitter 75. Thus, it is transmitted to form the output object beam 79, which becomes the other orthogonal, linearly polarized component of the combined input beam 108.

The orthogonal, linearly polarized, reference beam component 79 and linearly polarized object beam component 89 are to enter the first beam splitting surface 102c of the detector 100 according to a prescribed input relationship described below. If required, the object beam components 79 and 89 may pass through a polarization rotating element 70, which rotates the electric field vectors of the components 79 and 89 into a desired input relationship with the first beam splitting surface 102c of the detector 100, according to known techniques. In some configurations, the polarization rotating element 70 is not required. In any case, it will be appreciated that any relative phase shift that may be introduced by the polarization rotating element 70 between the reference and object beam components 79 and 89 is constant for all interferometric measurements. Therefore, such a relative phase shift is simply considered to be a part of a constant "phase offset" associated with the interferometer portion 60, regardless of whether the element 70 is fixtured as part of the interferometer portion 60, or the detector 100, or between them.

The detector 100 shown in FIG. 1 includes a non-polarizing beam splitting (NPBS) cube 102, and two polarizing beam splitting (PBS) cubes 106 and 112. Each of the beam splitting cubes 102, 106, and 112 comprises a pair of similarly numbered 45-90-45 prisms (102a, 102b, for the beam splitting cubes 102, and so on) joined at a similarly numbered beam splitting surface indicated by a dashed line (surfaces 102c, 106c, and 112c, respectively). A quarter wave element 104 is located between the NPBS cube 102 and the PBS cube 106. In various embodiments, the quarter wave element may be a quarter wave retarder plate. More generally, any other now-known or later-developed element that can introduce a desired phase shift between orthogonal, linearly polarized beams may be used, for example, volume holographic phase-retardation elements, form birefringent micro- or nano-structured gratings, and the like. The input to the detector 100 is the input beam 108, composed of the two orthogonal, linearly polarized beam components, reference and object beam components, 89 and 79, respectively.

In operation, the input beam 108 is split into two beams at surface 102c. A reflected beam 110 and a transmitted beam 128 result. According to one feature of the invention, the beam splitting cube 102 may be arranged such that the polarization directions of the orthogonal, linearly polarized components 89 and 79 of the input beam 108 form equal angles with the detector plane of incidence, which is defined by the input beam 108 and a vector normal to surface 102c at the point of incidence. Reflected beam 110 is incident on the PBS cube 112, which splits beam 110 at surface 112c. A reflected output beam 114 and a transmitted output beam 116 result.

In general, the PBS cube 112 may be oriented such that its transmission axis (that is, its polarizing direction in transmission) is parallel to either the p-polarized components or the s-polarized components of the reflected beam 110 (defined with reference to the surface 102c). Thus, it may be oriented to reflect the output beam 114 either parallel to, or perpendicular to the detector plane of incidence. In the embodiment illustrated in FIG. 1, the reflected output beam 114 is parallel to that plane. (In contrast, FIG. 3 shows an embodiment where a reflected output beam is nominally perpendicular to the detector plane of incidence.)

The PBS surface 112c causes similarly polarized components of the object and reference beams to "mix" or interfere in each of the output beams 114 and 116, to provide the desired output signals. In particular, the reference and object beam components included in the reflected beam 110 include s-polarized components and p-polarized components, defined with reference to the beam splitting surface 102c, and the polarizing directions that the PBS surface 112c provides for the output beams 114 and 116 are aligned exclusively with either the s-polarized components or the p-polarized components.

If the transmission axis of the PBS cube 112 is parallel to the detector's plane of incidence, then the p-polarized components of the object and reference beams included in the reflected beam 110 will interfere in the transmitted output beam 116, to provide an "A" signal, as indicated in FIG. 1.

The s-polarized components of the object and reference beams will interfere in the reflected output beam 114, to provide a "C" signal, as indicated in FIG. 1. The C signal will be inherently phase shifted by 180 degrees relative to the A signal, due to the operation of the PBS surface 102c. If the transmission axis of the PBS cube 112 is perpendicular to the plane of the beams 108 and 110, the phases of the A and C signals will be exchanged.

In this embodiment, the transmitted beam 128 is incident on the quarter wave element 104. The fast axis of quarter wave element 104 may be oriented along the polarization direction (electric field vector) of the reference beam. The object beam component of the transmitted beam 128' then emerges from the quarter wave element 104 retarded in phase by 90 degrees relative to the reference beam component. The transmitted beam 128' is incident on the PBS cube 106, which splits beam 128' at surface 106c. A reflected output beam 118 and a transmitted output beam 120 result. The PBS surface 106c causes similarly polarized components of the object and reference beams to "mix" or interfere in each of the output beams 118 and 120, to provide the desired output signals.

In general, the PBS cube 106 may be oriented such that its transmission axis (that is, its polarizing direction in transmission) is parallel to either the p-polarized components or the s-polarized components of the transmitted beam 128' (defined with reference to the surface 102c). Thus, it may be oriented to reflect the output beam 118 either parallel to, or perpendicular to the detector plane of incidence. In particular, the reference and object beam components included in the transmitted beam 128' include s-polarized components and p-polarized components, defined with reference to the beam splitting surface 102c, and the polarizing directions that the PBS surface 106c provides for the output beams 120 and 118 are aligned exclusively with either the s-polarized components or the p-polarized components.

If the transmission axis of the PBS cube 106 is parallel to the plane of the beams 108 and 110, then the p-polarized components of the object and reference beams included in the beam 128' will interfere in the transmitted output beam 120, to provide a "B" signal. The s-polarized components of the object and reference beams included in the beam 128' will interfere in the reflected output beam 118, to provide a "D" signal. The B signal will be inherently phase shifted by 180 degrees relative to the D signal, due to the operation of the PBS surface 106c, and the B signal will be phase shifted by nominally 90 degrees with respect to the A signal previously described, due to the operation of the quarter wave element 104. If the transmission axis of the PBS cube 106 is perpendicular to the detector plane of incidence, the phases of the B and D signals will be exchanged.

For the previously described configuration of the detector 100, the interfering p-polarized components of the object and reference beams have been oriented at similar, or symmetrical, angles of incidence relative to each surface encountered in the detector 100. Accordingly, the p-polarized components of the reference and object beams that interfere in the output beams 116 and 120 have undergone the same induced phase shift at the surfaces 102c, and at the surfaces 112c and 106c, respectively. The same is true for the s-polarized components of the object and reference beams that interfere in the output beams 114 and 118. Thus, nominally, the phase difference information in the input beam 108 is preserved in the output beams 114, 116, 118 and 120, regardless of any differential phase shift that may occur between the p- and s-components at any surface encountered.

However, a subtlety should be appreciated with respect to the optical path through the quarter wave element 104. As previously outlined, beamsplitter surfaces and/or coatings generally introduce differential phase shifts between the p and s polarization components of the beams with which they interact. The p-s differential phase shift in transmission is $\Delta^T_{P-S}$, as given by Eq. (1). As outlined above, differential phase shifts are not present in the output beams 114 and 116, because the interfering s-components interact similarly with each element along their beam path, and the interfering p-components interact similarly with each element along their beam path. However, the quarter wave element 104 in the path of the transmitted beam 128 prevents such a simple rejection of differential phase shifts.

In general, without special care, there will be a differential phase shift ATP-s between the s and p components of the reference beam included in the transmitted beam 128. Therefore, the reference beam will be somewhat elliptically polarized in the transmitted beam 128. For the same reason, the object beam will be somewhat elliptically polarized in the transmitted beam 128. If the fast axis of the quarter wave element 104 is aligned with the nominal polarization of the reference beam in the input beam 108, then in the transmitted beam 128 it will inevitably retard a "slow axis component" of the elliptically polarized reference beam, while not retarding a "fast axis component" of the elliptically polarized object beam. Phase error components will then be present in the beam 128' that is transmitted by the quarter wave element 104. In such a case, the interference signals in the output beams 118 and 120 will not be the ideal signals desired.

If it is necessary to overcome this problem to achieve sufficient accuracy, then the beamsplitting surface 102c may include a coating specifically designed or selected to adjust the differential phase shift $\Delta^T_{P-S}$ to a level that is insignificant, while also providing a desired ratio between the transmitted and reflected beam intensities. As a result the reference and object beams remain nominally linearly polarized and orthogonal in the transmitted beam 128, and the previously described phase error components need not arise in association with the quarter wave element 104. Since the coating only needs to control $\Delta^T_{P-S}$, not $\Delta^R_{P-S}$, it is relatively easy to fabricate the NPBS cube 102 with the desired characteristics. In some applications, $\Delta^T_{P-S}$ of +/−15 degrees or less is insignificant in that the resulting errors are insignificant compared to reasonably desirable accuracy levels, and/or the resulting errors may be adequately and reliably compensated. In other applications, $\Delta^T_{P-S}$ of +/−10 degrees or less may be desirable, and $\Delta^T_{P-S}$ of +/−5 degrees may be even more desirable.

In an alternative embodiment of the detector 100, the beamsplitting surface 102c includes a multi-function coating, which may be a multi-layer coating. The multi-function coating may be designed to control $\Delta^T_{P-S}$ to an insignificant level, to provide a desired ratio between the transmitted and reflected beam intensities, and to provide a quarter wave retardation of the object beam component relative to the reference beam component in the transmitted beam 128. As a result the quarter wave element 104 may be eliminated in this embodiment. Since the coating only needs to control $\Delta^T_{P-S}$, not $\Delta^R_{P-S}$, it is practical to fabricate such a multi-function coating for the NPBS cube 102. In such as case, we may functionally describe the light transmitted by the beam splitting surface as light that passes though a differential phase shift compensating element before the light passes through the phase-shifting element, even though the two elements of the coating may be merged and or indistinguishably integrated at the beam splitting surface.

Figure 2:
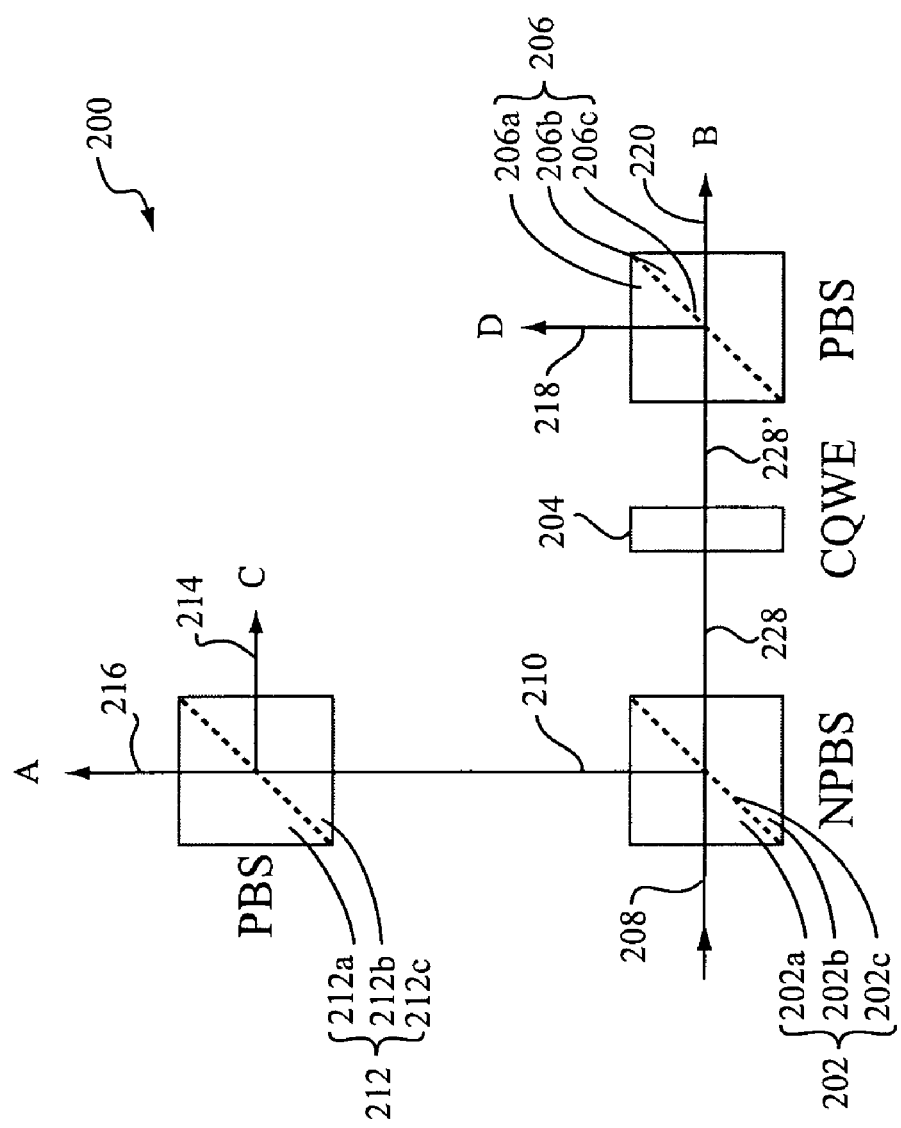
FIG. 2 illustrates a second exemplary quadrature-type detector.

FIG. 2 shows an exemplary detector 200, that overcomes the differential phase shift problem in a different manner. The detector 200 is constructed and operated approximately as previously described for the detector 100. Elements having similar 2XX and 1XX numbers in FIGS. 2 and 1, respectively, may be understood to be similarly or identically formed, arranged and operated, except as otherwise indicated herein by description or context. Therefore, only the significant differences between the detectors 200 and 100 will be described in detail here.

In particular, the detector 200 uses a compensating quarter wave element 204 rather than the "single-function" quarter wave element 104 used in the detector 100. Relatively ideal interference signals may result in the output beams 218 and 220 without the need for a special coating to control $\Delta^T_{P-S}$ at the beamsplitting surface 202c. By analogy with a previous description regarding the beamsplitting surface 102c, in the absence of a special coating, a differential phase shift $\Delta^T_{P-S}$ may occur at the beamsplitting surface 202c. The reference beam and the object beam will be somewhat elliptically polarized in the transmitted beam 228. However, the compensating quarter wave element 204 may be fabricated and oriented to overcome this problem.

In one exemplary embodiment, the compensating quarter wave element 204 may be considered to comprise first and second elements. A differential phase-shift compensating first element may have its fast axis oriented parallel to the p- or s-components transmitted by surface 202c and a structure or thickness such that a compensating phase shift of $-\Delta^T_{P-S}$ is provided to the transmitted beam, thereby canceling the undesirable phase shift $\Delta^T_{P-S}$ from surface 202c. The reference and object beams will be linearly polarized as they leave this first element and are input to a second element. The second element of the compensating quarter wave element 204 may comprise a quarter wave element (e.g. a retarder) that has its fast axis oriented along the polarization direction of the reference beam. As the transmitted beam 228' leaves the second element of the compensating quarter wave element 204 the included reference and object beam components will be linearly polarized and have an intentionally induced relative phase shift of 90 degrees, as desired. In various embodiments the first and second elements may be bonded together to form a monolithic compensating quarter wave element 204.

Figure 3A:
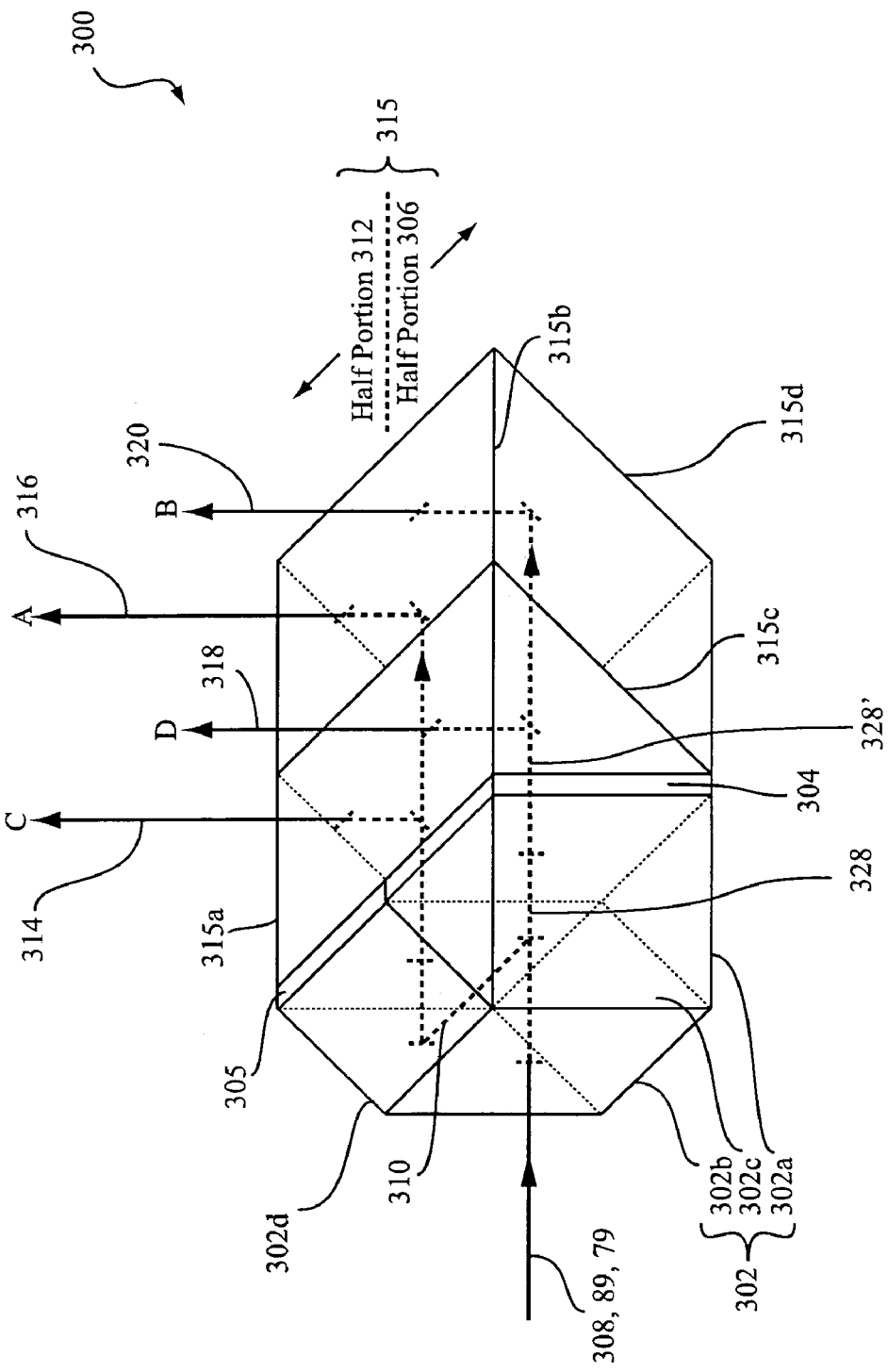
FIGS. 3A-3C illustrate three views of a third exemplary quadrature-type detector.
Figure 3C:
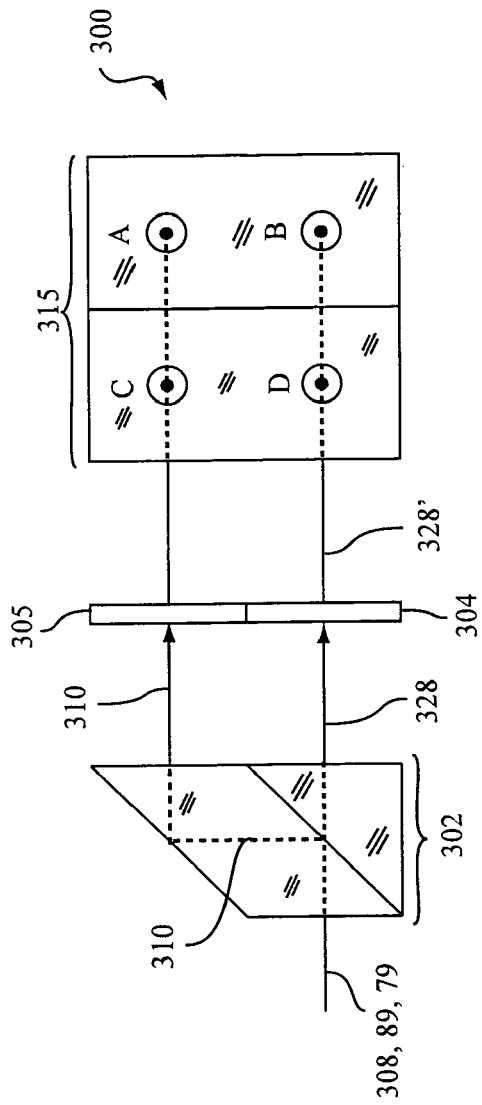
Figure 3B:
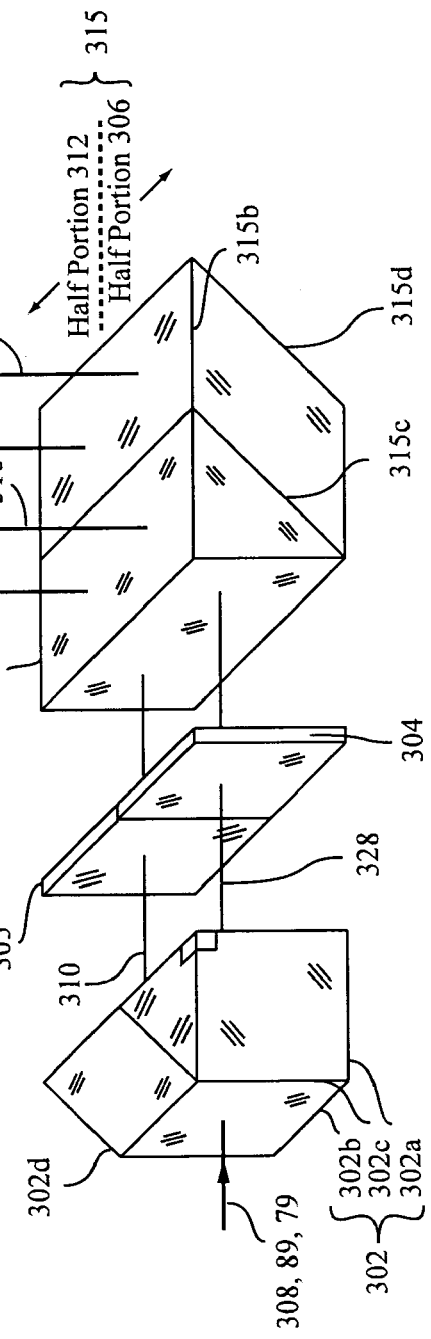

FIGS. 3A-3C illustrate another exemplary detector 300. FIG. 3A shows an isometric view including various hidden lines and beam paths, FIG. 3B shows an exploded isometric view, and FIG. 3C shows an exploded plan view, including various beam paths. Generally, interior beam paths and hidden lines are illustrated using dashed lines. The detector 300 is constructed and operated according to principles previously described with reference to the detector 100, and is functionally analogous. Elements having similar 3XX and 1XX numbers in FIGS. 3A-3C and FIG. 1, respectively, may be understood to perform similar or identical functions and to have surface orientations and/or provide polarizing directions that are similar with respect to the polarizations of the various beam components that traverse the detector 300 in a manner analogous to their counterparts in the detector 100. Therefore, only the significant differences between the detectors 300 and 100 will be described in detail here.

The detector 300 includes a non-polarizing beam splitting (NPBS) element 302, and a polarizing beam splitting (PBS) element 315. The NPBS element 302 comprises a 45-90-45 prism 302a and a rhomboid prism 302b joined at a beam splitting surface 302c. The PBS element 315 comprises a 45-90-45 prism 315a and a rhomboid prism 315b joined at a beam splitting surface 315c. Far and near halves of the PBS element 315 are designated far PBS half-portion 312 and near PBS half-portion 306, respectively. A quarter wave retarder element 304 is located between the NPBS element 302 and the near PBS half-portion 306. A transparent spacer 305, of a thickness similar to the plate 304, is located between the NPBS element 302 and the far PBS half-portion 312.

The input to the detector 300 is an input beam 308, composed of two orthogonal linearly polarized beam components, reference and object beam components, 89 and 79, respectively. In operation, the input beam 308 is split into two beams at surface 302c, which may include a differential phase shift compensating coating as previously described herein. A reflected beam 310 and a transmitted beam 328 result. The beam splitting surface 302c may be arranged such that the polarization directions of the orthogonal, linearly polarized components 89 and 79 of the input beam 308 form equal angles with the detector plane of incidence, which is defined by the input beam 308 and a vector normal to surface 302c at the point of incidence. Reflected beam 310 is incident on a surface 302d and is deflected (for example, by total internal reflection) along the detector plane of incidence to be transmitted through the transparent spacer 305, and input to the far PBS half-portion 312. In the far PBS half-portion 312, the deflected beam 310 is split at the PBS surface 315c. A reflected output beam 314 and a transmitted beam result. The transmitted beam is incident on a surface 315d and is deflected (for example, by total internal reflection) along a direction perpendicular to the detector plane of incidence, to provide transmitted output beam 316.

In this embodiment, the transmission axis of the PBS surface 315c (that is, its polarizing direction in transmission) is oriented parallel to the s-polarized components of the reflected beam 310 (defined with reference to the surface 302c). Accordingly, the s-polarized components of the object and reference beams (as defined with respect to surface 302c) included in the deflected beam 310 will interfere in the transmitted output beam 316, to provide an "A" signal. The p-polarized components of the object and reference beams (as defined with respect to surface 302c) will interfere in the reflected output beam 316, to provide a "C" signal that is shifted in phase by 180 degrees relative to the A signal.

The transmitted beam 328 is incident on the quarter wave element 304. In general, the fast axis of the quarter wave element 304 may be aligned with the polarization of either the reference beam component or the object beam component of the transmitted beam 328. If the fast axis of the quarter wave element 304 is aligned with the polarization of the reference beam component, then the object beam component of the transmitted beam 328' emerges from the quarter wave element 304 retarded in phase by 90 degrees relative to the reference beam component. The transmitted beam 328' is input to the near PBS half-portion 306. In the near PBS half-portion 306, the transmitted beam 328' is split at the PBS surface 315c. A reflected output beam 318 and a transmitted beam result. The transmitted beam is incident on the surface 315d and is deflected along a direction perpendicular to the detector plane of incidence to provide transmitted output beam 320. In this embodiment, the transmission axis of the PBS surface 315c is oriented perpendicular to the detector plane of incidence. Thus, the s-polarized components of the object and reference beams (as defined with respect to surface 302c) included in the transmitted beam 328' will interfere in the transmitted output beam 320, to provide a "B" signal that is 90 degrees out-of-phase relative to the A signal. The p-polarized components of the object and reference beams will interfere in the reflected output beam 318, to provide a "D" signal that is 180 degrees out-of-phase relative to the B signal.

For the previously described configuration of the detector 300, the interfering s-polarized components of the object and reference beams that interfere in the output beams 316 and 320 have been oriented at similar, or symmetrical, angles of incidence relative to each surface encountered in the detector 300. The same is true for the p-polarized components of the object and reference beams that interfere in the output beams 314 and 318. Thus, nominally, the phase difference information in the combined beam 308 is preserved in the output beams 314, 316, 318 and 320, regardless of any differential phase shift that may occur between the p- and s-components at any surface encountered. One assembly advantage of the detector 300 is that photodetectors for sensing the signals A-D may be located adjacent to each other in the same plane.

Figure 4:
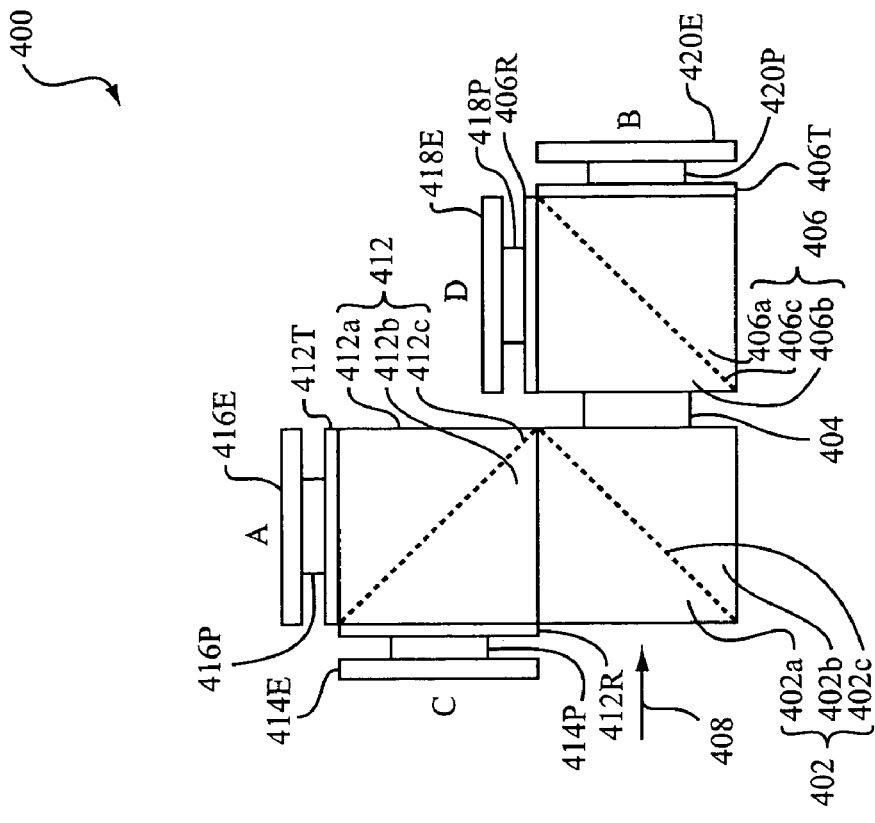
FIG. 4 illustrates a fourth exemplary quadrature-type detector in the form of a compact monolithic assembly.
Figure 4:
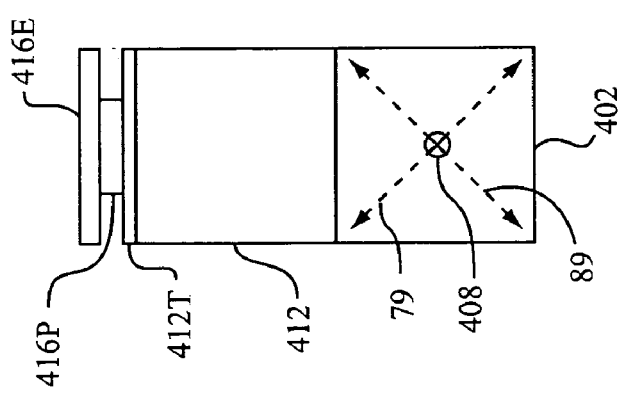

FIG. 4 illustrates another exemplary detector 400. A side view of the "beam entrance" side of the detector 400 is shown at the left of FIG. 4, and a plan view is shown at the right of FIG. 4. The detector 400 is constructed and operated according to principles previously described with reference to the detector 100, and is functionally analogous. Elements having similar 4XX and 1XX numbers in FIGS. 4 and 1, respectively, may be understood to perform similar or identical functions and to have surface orientations and/or provide polarizing directions that are similar with respect to the polarizations of the various beam components that traverse the detector 400 in a manner analogous to their counterparts in the detector 100. Therefore, only the significant differences between the detectors 400 and 100 will be described in detail here.

In addition to the 4XX elements that will be understood by similarity to their previously described 1XX counterparts, the detector 400 includes a quarter wave element (QWE) 404, high extinction linear polarizers 406T, 406R, 412T and 412R, and photodetectors 420P, 418P, 416P and 414P that are included in amplifier circuit assemblies 420E, 418E, 416E and 414E, respectively.

The QWE 404 may be designed and oriented according to principles previously described for the QWE 104, shown in FIG. 1. The "slow axis" beam component (that is, either the object or reference beam component, depending on the orientation of the of the QWE 404) emerges from the QWE 404 retarded by 90 degrees of phase shift relative to the "fast axis" beam component, as previously described.

The high extinction polarizers 406T, 406R, 412T and 412R may be added to the output faces of the PBS cubes 406 and 412, as shown, in order to reinforce the degree of polarization selectivity provided by the PBS cubes 406 and 412, if desired. The high extinction polarizers 406T and 412T are oriented such that their transmission axes are parallel to the transmission axes of the by the PBS cubes 406 and 412, respectively. The high extinction polarizers 406R and 412R are oriented such that their transmission axes are perpendicular to the transmission axes provided by the high extinction polarizers 406T and 412T, respectively. In various embodiments, non-polarizing beam splitters may be used in place of the PBS cubes 406 and 412, and the high extinction polarizers 406T, 406R, 412T and 412R may be the only mixing polarizers used to provide the "s-only" and "p-only" interference signals at the various outputs.

The photodetectors 420P, 418P, 416P and 414P of the amplifier circuit assemblies 420E, 418E, 416E and 414E, respectively, may be positioned to receive the various interference light signals previously described herein. The respective amplifier circuits may have components that are usable to adjust the peak-to-peak amplitudes and/or DC offsets of their electrical outputs to similar values, if desired. All abutting elements of the detector 400 may be bonded together, if desired, to form a stable monolithic detector.

In the input beam 408, the orientation of the orthogonal, linearly polarized reference and object beam components, 89 and 79 relative to the detector 400 may be approximately as shown in the "entrance side" view at the left of FIG. 4, which is consistent with other more precise descriptions herein. The desired relative orientation may be provided by any convenient means. The detector 400 may be fixtured at the desired rotation angle relative to a fixed orientation of the reference beam 89 and object beam 79 components in an output beam from an interferometer, or the polarization angles of the reference and object beams may be rotated by the use of a half-wave plate arrangement, or the like, for example. In many cases the use of a properly oriented half-wave plate arrangement may be the more convenient fabrication option when assembling a complete interferometer+detector system aligned along a single plane. In such a case, a properly oriented half-wave plate may be bonded to the input face of the NPBS 402, if desired.

The foregoing embodiments provide high accuracy detectors that provide 4 signals that may be processed to reduce certain common mode DC and amplitude errors, by means of processing described further below. However, it should be appreciated that configurations that provide 2 quadrature signals may use the inventive principles disclosed herein, to provide somewhat less robust phase difference measurement at a lower cost. For example, with reference to FIG. 4, the elements 412, 412R, 414P, 414E, 406, 406R, 418P, and 418E may be eliminated. The group of elements 412T, 416P and 416E may be moved along their intervening optical path to abut element 402. The group of elements 406T, 420P and 420E may also be moved along their intervening optical path to abut element 404. The resulting detector configuration will provide two output signals that differ by a relative phase shift of 90 degrees, and that are provided by interference exclusively between either s-components or p-components of the reference and object beams that reach the polarizers 406T and 412T. The two signals may be processed to determine the phase difference between the orthogonal, linearly polarized reference and object components of the input beam 408.

Figure 5:
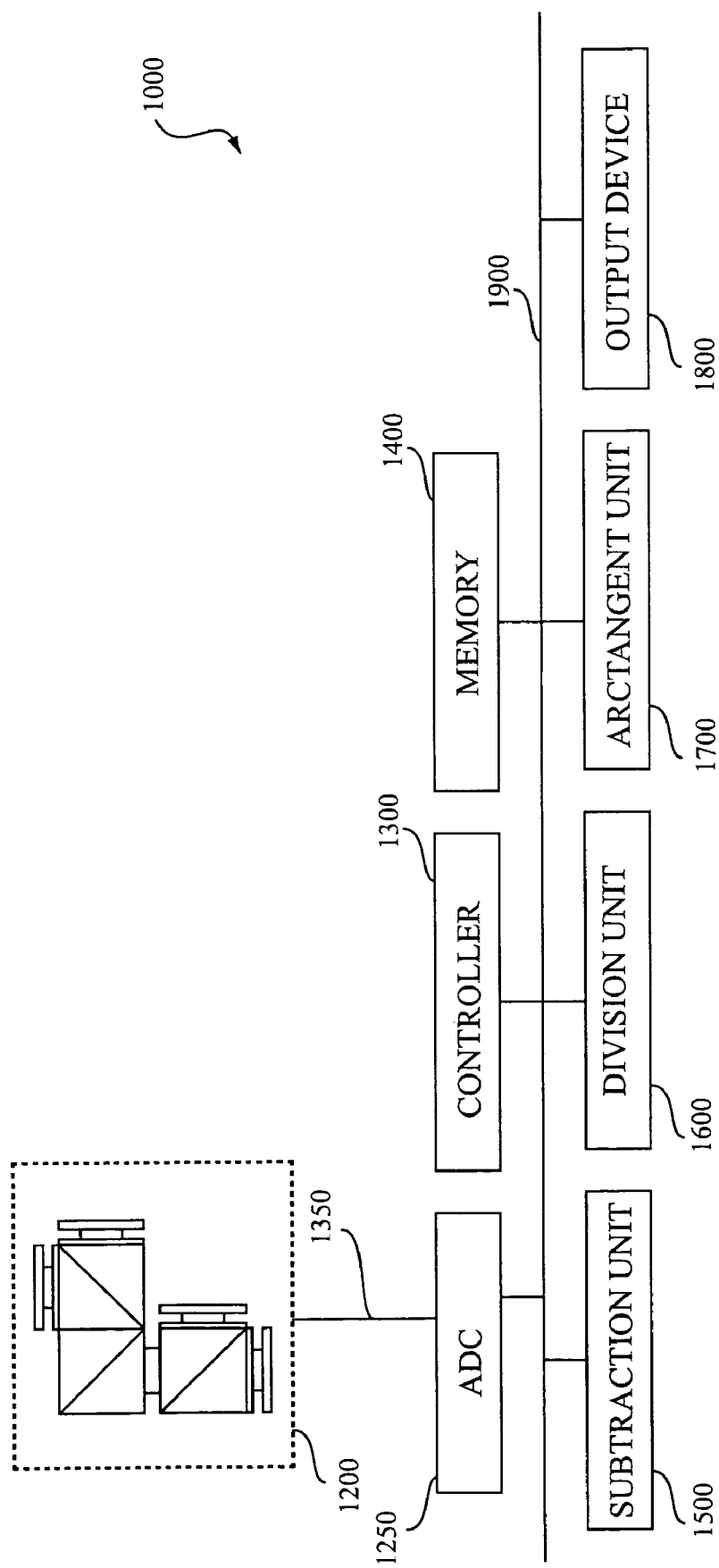
FIG. 5 illustrates an exemplary system using a detector according to this invention.

FIG. 5 shows one exemplary system 1000 that may be used to calculate the phase difference between an object beam and a reference beam using a detector 1200. The system 1000 includes an analog to digital converter (ADC) 1250, a controller 1300, a memory 1400, a subtraction unit 1500, a division unit 1600, an arctangent unit 1700, and an output device 1800. The aforementioned units 1250-1700 may be coupled on bus 1900, or they may be integrated into an application-specific integrated circuit (ASIC), for example. Units 1500-1700 may be implemented as software stored in memory 1400 and executed on controller 1300, or they may be implemented as hardware circuits, for example, in an application-specific integrated circuit (ASIC). Any hardware or software implementation which performs the function of units 1250-1800 may be used to practice these systems and methods.

ADC 1250 is coupled to receive output signals from the detector 1200, for example, through a bus or cable 1350. Detector 1200 may be any of detectors 100-400, or any other configuration according to this invention, and may include photodetectors, and signal amplifying and/or processing circuits, if desired. For example, in one embodiment, respective photodetectors "A-D", corresponding to the optical signals A-D described previously, may receive optical signals that vary sinusoidally according to the phase difference between the object and reference beams. The respective photodetectors A-D may output electrical signals proportional to the optical signals: signals A (0°="reference" phase), B (90° relative phase shift), C (180° relative phase shift), and signal D (270° relative phase shift). In one embodiment, the electrical signals A-D may be directed to amplifier circuits that are adjusted to provide similar peak-to-peak amplitudes and DC offsets for all the signals, and then output to the ADC, and the resulting digitized values are stored in memory 1400. Alternatively, raw amplified signals A-D may be output to the ADC 1250, and such operations governed by the controller 1300 may make such adjustments to the digitized values before they are stored, if desired.

Subtraction unit 1500 then retrieves signals A-D from memory, calculates (A-C), and (B-D), designated here as Sig. 1 and Sig. 2, respectively, and stores those values in memory 1400. Division unit 1600 then retrieves Sig. 1 and Sig. 2, and calculates and stores (Sig. 1/Sig. 2). Sig. 1 and Sig. 2 are approximately sinusoidal signals (as a function of the phase difference to be determined) that are out of phase by 90 degrees. They may behave as sine and cosine signals. Accordingly, the phase difference to be measured is indicated by arctan(Sig. 1/Sig. 2), with an ambiguity of 180°. The ambiguity may be eliminated by examining the signs of the signals. Therefore, the arctangent unit 1700 retrieves the ratio (Sig. 1/Sig. 2) and the signs of Sig. 1 and Sig. 2, and determines the phase difference, and outputs the phase difference to output device 1800.

Output device 1800 may be a display, another controller, or another memory, for example. It should be appreciated that an additional calibration or compensation determining and/or applying unit may be included in the system 1000 to determine and compensate or calibrate various errors associated with the signals A, B, C and D that are not addressed by the operations described above, for example, residual orthogonality errors, amplitude errors, and the like, may be addressed by a unit which provides operations equivalent to well-known methods of calibration and/or compensation based analogous to the correction of lissajous patterns derived from similar quadrature signals.

Figure 6:
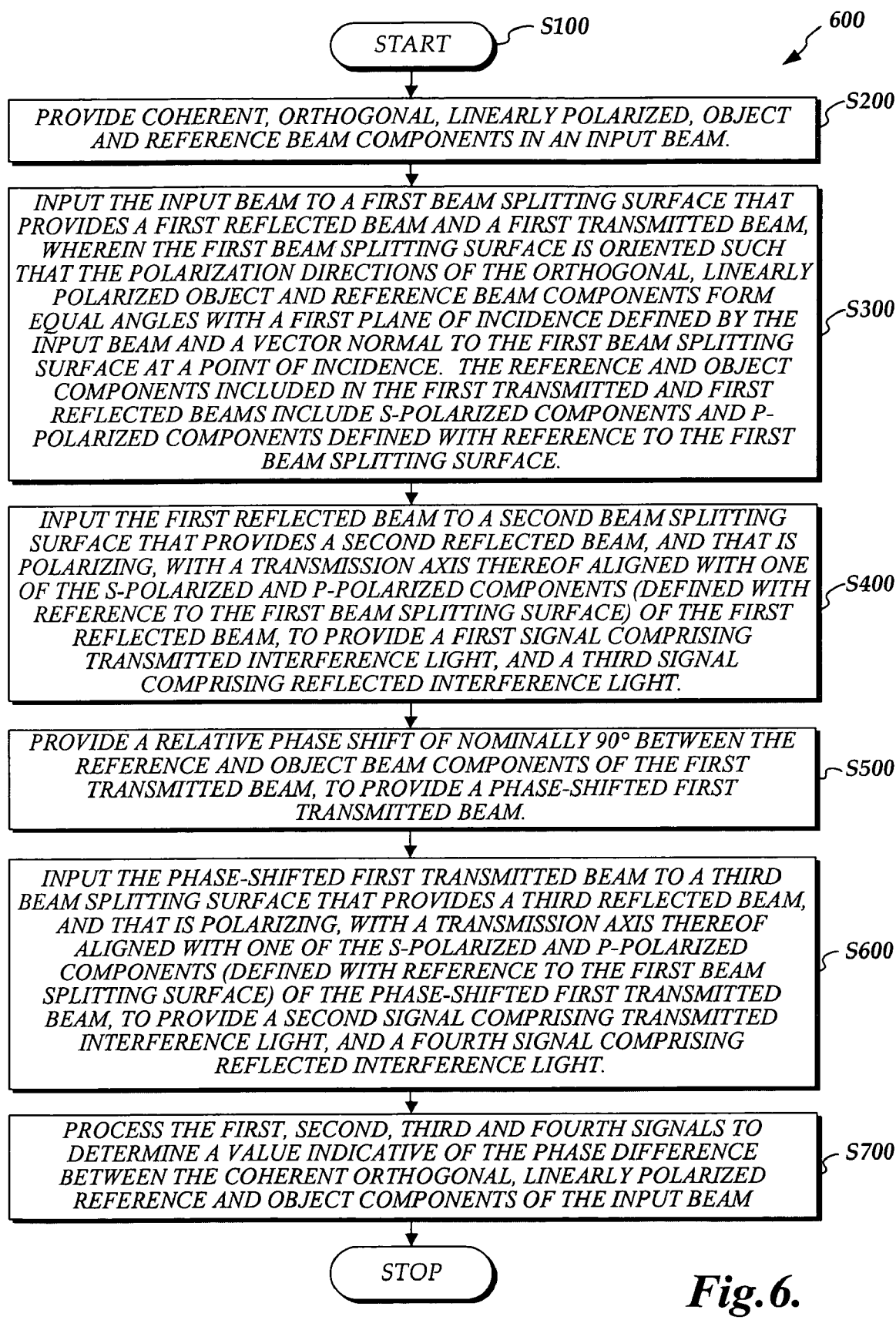
FIG. 6 is an exemplary flowchart of a method for using one configuration of a quadrature-type detector according to this invention.

FIG. 6 is a flowchart illustrating an exemplary method 600 for performing operations usable to determine a value indicative of the phase difference between coherent orthogonal, linearly polarized reference and object beam components in an input beam, using one configuration of a detector according to this invention. The method starts in step S100 and proceeds to step S200, where coherent, orthogonal, linearly polarized, object and reference beam components are provided in an input beam. In step S300, the input beam is input to a first beam splitting surface that provides a first reflected beam and a first transmitted beam, wherein the first beam splitting surface is oriented such that the polarization directions of the orthogonal, linearly polarized object and reference beam components form equal angles with a first plane of incidence defined by the input beam and a vector normal to the first beam splitting surface at a point of incidence. The reference and object components included in the first transmitted and first reflected beams include s-polarized components and p-polarized components defined with reference to the first beam splitting surface. In step S400, the first reflected beam is input to a second beam splitting surface that provides a second reflected beam, and that is polarizing, with a transmission axis thereof aligned with one of the s-polarized and p-polarized components (defined with reference to the first beam splitting surface) of the first reflected beam, to provide a first signal comprising transmitted interference light, and a third signal comprising reflected interference light.

In step S500, a relative phase shift of nominally 90° is provided between the reference and object beam components of the first transmitted beam, to provide a phase-shifted first transmitted beam. In step S600, the phase-shifted first transmitted beam is input to a third beam splitting surface that provides a third reflected beam, and that is polarizing, with a transmission axis thereof aligned with one of the s-polarized and p-polarized components (defined with reference to the first beam splitting surface) of the phase-shifted first transmitted beam, to provide a second signal comprising transmitted interference light, and a fourth signal comprising reflected interference light. In step S700, the first, second, third and fourth signals are processed to determine a value indicative of the phase difference between the coherent orthogonal, linearly polarized reference and object components of the input beam, and the method stops.

Figure 7:
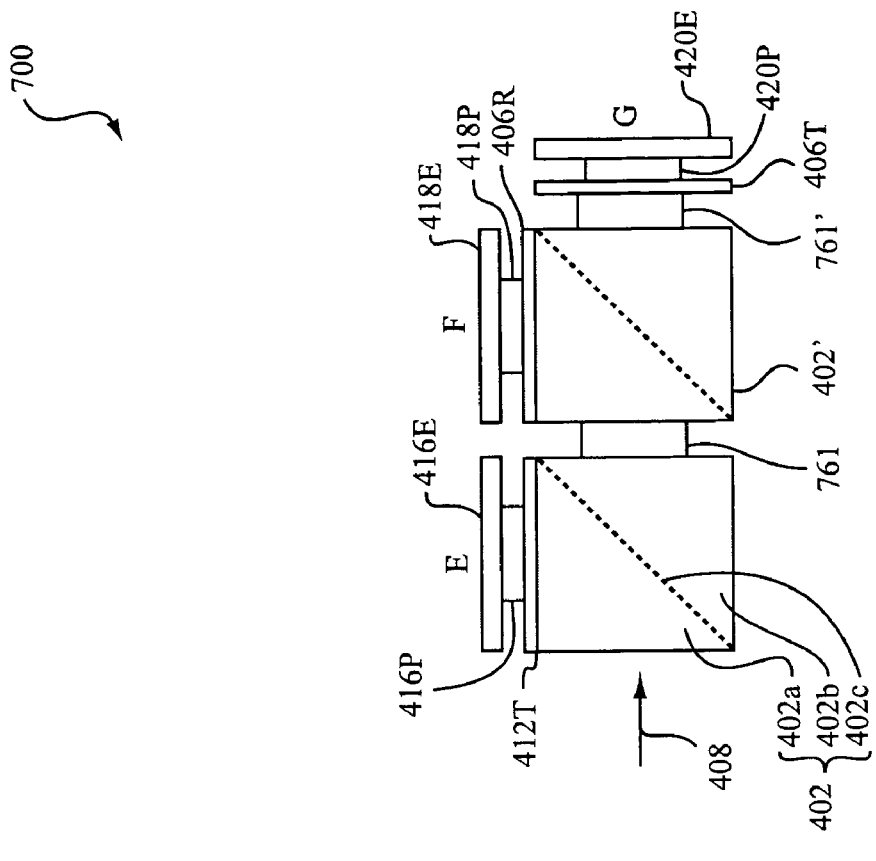
FIG. 7 illustrates an exemplary three-phase detector according to this invention.
Figure 7:
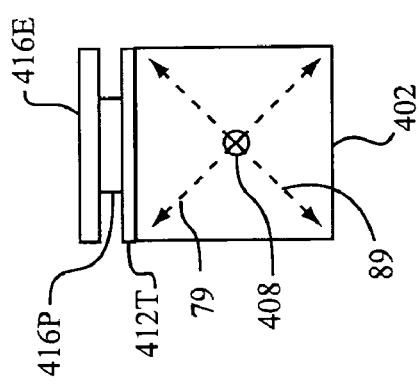

FIG. 7 illustrates another exemplary detector 700. A side view of the "beam entrance" side of the detector 700 is shown at the left of FIG. 7, and a plan view is shown at the right of FIG. 7. The detector 700 is constructed and operated according to principles previously described with reference to the detector 400, and is functionally analogous, except the detector 700 is a three-phase detector, rather than a quadrature detector. Elements having similar 4XX and 4XX numbers in FIGS. 7 and 4, respectively, may be understood to perform similar or identical functions and to have surface orientations and/or provide polarizing directions that are similar with respect to the polarizations of the various beam components that traverse the detector 700 in a manner analogous to their counterparts in the detector 400. Therefore, only the significant differences between the detectors 700 and 400 will be described in detail here.

In addition to the 4XX elements previously described with reference to FIG. 4, the detector 700 includes one-third wave elements 761 and 761'. Also, a non-polarizing beam splitter 402', that may be identical to the non-polarizing beam splitter 402, is substituted for the polarizing beamsplitter 406 shown in FIG. 4. The one-third wave elements 761 and 761' may be designed and oriented according to principles previously described for the QWE 104, shown in FIG. 1, except the elements 761 and 761' are designed to provide a relative phase shift of 120 degrees instead of 90 degrees. The "slow axis" beam component (that is, either the object or reference beam component, depending on the orientation of the one-third wave element 761 or 761') emerges from the one-third wave element 761 or 761' retarded by 120 degrees of phase shift relative to the "fast axis" beam component.

Briefly, in operation, the input beam 408 is split into a reflected beam and a transmitted beam at the splitting surface 402c, which may include a transmissive differential phase shift compensating element integrated in its coating as previously described herein. The p-polarized components of the reference and object beam components in the reflected beam are transmitted by the polarizer 412T, which has a transmission axis aligned with those p-polarized components. The transmitted p-polarized components interfere to provide an "E" signal. The beam transmitted by the beam splitting surface 402c passes through the one-third wave element 761 such that one of its reference and object beam components is phase shifted by 120 degrees relative to the other. It is then split into a second reflected beam and a transmitted beam at the beam splitting surface of the non-polarizing beam splitter 402', which may also include a transmissive differential phase shift compensating element integrated in its coating. The transmission axis of the polarizer 406R may be aligned with either the p-polarized components or the s-polarized components of the reference and object beam components in the second reflected beam. The beam components transmitted by the polarizer 406R interfere to provide an "F" signal that differs from the E signal by 120 degrees of relative phase shift. The beam transmitted at the non-polarizing beam splitter 402' passes through the one-third wave element 761' such that one of its reference and object beam components is phase shifted by an additional 120 degrees relative to the other. The transmission axis of the polarizer 406T may be aligned with either the p-polarized components or the s-polarized components of the reference and object beam components in its received beam. The beam components transmitted by the polarizer 406T interfere to provide a "G" signal that differs from the E signal by 240 degrees of relative phase shift.

A specific example of methods for connecting and processing three-phase position signals is described in U.S. Pat. No. 6,906,315, which is hereby incorporated by reference in its entirety. In particular, three-phase optical intensity signals can be processed by the exemplary method described in the '315 patent to determine two derived quadrature signal values. The derived quadrature signal values may be analyzed as previously described for the signals Sig. 1 and Sig. 2, with reference to FIG. 5, in order to determine the phase difference between the reference and object beam components in the input beam.

Although the foregoing embodiments have shown each phase-shifting element located along a transmitted beam path after a non-polarizing beam splitting surface, in various embodiments, such phase-shifting elements may be located along a reflected beam path after a non-polarizing beam splitting surface. In such as case, it should be appreciated that any differential phase shift between p- and s-components included along the transmitted beam path will not detrimentally affect the output signals derived from the light included in the transmitted beam path, because those output signals will be derived from interference light comprising exclusively p-polarized components, or interference light comprising exclusively s-polarized components. Accordingly, in such a case, any differential phase shift compensating elements should be designed and located to adjust the differential phase shift $\Delta^R_{P-S}$ in the reflected light from a non-polarizing beam splitting surface before its reaches a phase-shifting element along a reflected beam path. The differential phase shift compensating element may comprise a coating element integrated with the beam splitting surface. Because the coating elements at the beam splitting surface only need to control $\Delta^R_{P-S}$ and the intensity split ratio, it is practical to fabricate a coating with the desired characteristics. However, it should be appreciated that, in general, in conventional beam splitter coatings, $\Delta^R_{P-S}$ may generally be significantly larger than $\Delta^T_{P-S}$. Adjusting $\Delta^R_{P-S}$ to an insignificant level, although a practical alternative in various embodiments, may generally be more difficult or expensive than adjusting $\Delta^T_{P-S}$ to an insignificant level in other embodiments, such as those described in detail above.

While various details have been described in conjunction with exemplary implementations as outlined above, it is evident that many alternatives, modifications and variations are possible. For example, a detector may include other optical elements, such as additional phase-shifting elements or half wave plates, lenses and filters, in order to accomplish a specific purpose. Additionally, as with any optical configuration, mirrors, or other beam deflecting elements may be used into provide various beam paths and/or element locations that vary from the exemplary geometrical planes of the embodiments described herein. It will be appreciated that such configurations may still embody the various operating principles and error rejection techniques disclosed herein, and be functionally equivalent. Accordingly, the exemplary implementations as set forth above are intended to be illustrative, not limiting.

What is claimed is:

1. A detector for providing signals indicative of a phase difference between orthogonal, linearly polarized reference and object components of an interferometric measurement beam, comprising:
    at least a first beam splitting surface;
    at least first and second polarizers; and
    at least a first phase-shifting element,
    wherein the detector is configured such that:
        the first beam splitting surface is non-polarizing and is configured to receive the orthogonal, linearly polarized reference and object components as an input beam and to provide a first transmitted beam along a first transmitted beam path and a first reflected beam along a first transmitted beam path from the first beam splitting surface,
        the first beam splitting surface is configured such that when the orthogonal, linearly polarized reference and object components of the input beam are incident on the first beam splitting surface, polarization directions of the orthogonal, linearly polarized reference and object components form equal angles with a first plane of incidence defined by the input beam and a vector normal to the first beam splitting surface at a point of incidence of the input beam,
        such that reference and object components included in the first transmitted beam and the first reflected beam each include s-polarized components and p-polarized components defined with reference to the first plane of incidence,
        the first phase-shifting element is configured along one of the first transmitted beam path and the first reflected beam path to provide a phase-shift between the reference and object components in one of the first transmitted beam and the first reflected beam, and
        the first and second polarizers are arranged along the first reflected beam path and the first transmitted beam path, respectively, and configured to provide output signals such that:
            a first output signal derived from the first reflected beam is derived from interfering components of the reference and object components included in the first reflected beam that are nominally exclusively one of the p-polarized components and the s-polarized components defined with reference to the first plane of incidence;
            a second output signal derived from the first transmitted beam is derived from interfering components of the reference and object components included in the first transmitted beam that are nominally exclusively one of the p-polarized components and the s-polarized components defined with reference to the first plane of incidence; and
            a relationship between at least the first and second output signals is indicative of the phase difference between the orthogonal, linearly polarized reference and object components of the input beam.

2. The detector of claim 1 further comprising a number of respective differential phase shift compensating elements corresponding to a number of respective phase-shifting elements included in the detector, wherein:
    each respective differential phase shift compensating element is configured to adjust a differential phase shift between the p-polarized and s-polarized components for each of the object and reference beam components that are output by a respective non-polarizing beam splitting surface and that are to be input to a respective phase-shifting element, each differential phase shift compensating element adjusting the differential phase shift to be at most degrees to +/−5 provide nominally orthogonal, linearly polarized reference and object components that are input to the respective phase-shifting element; and
    each respective differential phase shift compensating element comprises one of a coating element at a respective non-polarizing beam splitting surface and a birefringent element located to receive the p-polarized and s-polarized components output by a respective non-polarizing beam splitting surface.

3. The detector of claim 2 wherein:
    each respective differential phase shift compensating element comprises a respective coating element at a respective non-polarizing beam splitting surface; and
    the respective coating adjusts the differential phase shift of the beam splitting surface in transmission or reflection based on whether the respective phase shifting element corresponding to a respective coating element is located to receive a transmitted or reflected beam from the beam splitting surface.

4. The detector of claim 3, wherein each respective phase-shifting element is located to receive a transmitted beam from a respective non-polarizing beam splitting surface.

5. The detector of claim 4, wherein each differential phase shift compensating element is configured to adjust the differential phase shift between the p-polarized and s-polarized components to less than +/−5 degrees.

6. The detector of claim 2, wherein:
    the first polarizer is oriented with a transmission axis thereof aligned with one of the s-polarized components and the p-polarized components of the reference and object components in the first reflected beam and is configured to provide the first output signal, which comprises interference light transmitted through the first polarizer;
    the first phase-shifting element is arranged along the first transmitted beam path between the first beam splitting surface and the second polarizer and is configured to transmit relative phase-shifted reference and object components in the first transmitted beam that are phase shifted relative to one another by a first amount determined by the first phase-shifting element; and
    the second polarizer is arranged to receive the relative phase-shifted reference and object components in the first transmitted beam, and is oriented with a transmission axis thereof aligned with one of the s-polarized components and the p-polarized components of the relative phase-shifted reference and object components in the first transmitted beam and is configured to provide the second output signal, which comprises interference light transmitted through the second polarizer.

7. The detector of claim 6, wherein the first output signal comprises transmitted interference light components having a first phase difference, and the second output signal comprises transmitted interference light components having a second phase difference that differs from the first phase difference by nominally 90 degrees.

8. The detector of claim 7, comprising a second beam splitting surface and a third beam splitting surfaces wherein:
the first polarizer is located at the second beam splitting surface;
the second beam splitting surface is configured to partially transmit and partially reflect the first reflected beam and to provide a second reflected beam;
the second beam splitting surface is oriented to reflect the second reflected beam one of parallel to and perpendicular to the first plane of incidence;
the second reflected beam comprises the one of the s-polarized components and the p-polarized components of the reference and object components in the first reflected beam that are not aligned with the transmission axis of the first polarizer and provides a third output signal comprising interference light reflected from the first polarizer;
the second polarizer is located at the third beam splitting surface;
the third beam splitting surface is located to receive the relative phase-shifted reference and object components in the first transmitted beam;
the third beam splitting surface is configured to partially transmit and partially reflect the relative phase-shifted reference and object components in the first transmitted beam to provide a third reflected beam;
the third beam splitting surface is oriented to reflect the third reflected beam one of parallel to and perpendicular to the first plane of incidence;
the third reflected beam comprises the one of the s-polarized components and the p-polarized components of the reference and object components in the first transmitted beam that are not aligned with the transmission axis of the second polarizer and provides a fourth output signal comprising interference light reflected from the second polarizer at the third beam splitting surface;
the third output signal comprises reflected interference light components having a third phase difference that differs from the first phase difference by nominally 180 degrees, and the fourth output signal comprises reflected interference light components having a fourth phase difference that differs from the second phase difference by nominally 180 degrees; and
a relationship between first, second, third and fourth output signals is indicative of the phase difference between the orthogonal, linearly polarized reference and object components in the input beam.

9. The detector of claim 2, comprising a second beam splitting surface, a third polarizer, and a second phase-shifting element, wherein:
the first polarizer is oriented with a transmission axis thereof aligned with one of the s-polarized components and the p-polarized components of the reference and object components in the first reflected beam and is configured to provide the first output signal, which comprises interference light transmitted through the first polarizer;
the first phase-shifting element is arranged along the first transmitted beam path between the first beam splitting surface and the second beam splitting surface and is configured to transmit reference and object components in the first transmitted beam such that they are phase shifted relative to one another by a first phase shift amount of 120 degrees;
the second beam splitting surface is non-polarizing and is located to receive the reference and object components in the transmitted beam from the first phase shifting element;
the second beam splitting surface is configured to partially transmit and partially reflect the received reference and object components in the first transmitted beam from the first phase shifting element light to provide a second reflected beam including relative phase-shifted reference and object components that each include s-polarized components and the p-polarized components;
the second beam splitting surface is oriented to reflect the second reflected beam one of parallel to and perpendicular to the first plane of incidence;
the third polarizer is arranged along the second reflected beam and is oriented with a transmission axis thereof aligned with one of the s-polarized components and the p-polarized components of the relative phase-shifted reference and object components in the second reflected beam to provide a third output signal, which comprises interference light transmitted through the third polarizer;
the second phase-shifting element is arranged along the first transmitted beam path between the second beam splitting surface and the second polarizer to receive the first transmitted beam that is partially transmitted by the second beam splitting surface, and is configured to transmit the reference and object components in the first transmitted beam such that they are phase shifted relative to one another by a second phase shift amount that differs by 120 degrees from the first phase shift amount;
the second polarizer is arranged along the first transmitted beam path to receive the reference and object components in the first transmitted beam from the second phase-shifting element;
the second polarizer is oriented with a transmission axis thereof aligned with one of the s-polarized components and the p-polarized components of the reference and object components in the first transmitted beam received from the second phase-shifting element, to provide the second output signal, which comprises interference light transmitted through the second polarizer;
the first output signal comprises transmitted interference light components having a first phase difference, the second output signal comprises transmitted interference light components having a second phase difference that differs from the first phase difference by nominally 120 degrees, and the third output signal comprises transmitted interference light components having a third phase difference that differs from each of the first and second phase differences by nominally 120 degrees; and
a relationship between the first, second, and third output signals is indicative of the phase difference between the orthogonal, linearly polarized reference and object components in the input beam.

10. The detector of claim 1, wherein a plurality of optical components of the detector are assembled to form a monolithic assembly.

11. The detector of claim 1, wherein the detector further comprises an interferometric measurement system that outputs the orthogonal, linearly polarized reference and object components of the input beam.

12. The detector of claim 1, wherein:
the first polarizer is oriented with a transmission axis thereof aligned with one of the s-polarized components and the p-polarized components of the reference and object components in the first reflected beam and is configured to provide the first output signal, which comprises interference light transmitted through the first polarizer;
the first phase-shifting element is arranged along the first transmitted beam path between the first beam splitting surface and the second polarizer and is configured to transmit relative phase-shifted reference and object components in the first transmitted beam that are phase shifted relative to one another by a first amount determined by the first phase-shifting element; and
the second polarizer is arranged to receive the relative phase-shifted reference and object components in the first transmitted beam; and
the second polarizer is oriented with a transmission axis thereof aligned with one of the s-polarized components and the p-polarized components of the relative phase-shifted reference and object components in the first transmitted beam and is configured to provide the second output signal, which comprises interference light transmitted through the second polarizer.

13. The detector of claim 12, comprising a second beam splitting surface and a third beam splitting surface, wherein:
the first polarizer is located at the second beam splitting surface;
the second beam splitting surface is configured to partially transmit and partially reflect the first reflected beam and to provide a second reflected beam;
the second beam splitting surface is oriented to reflect the second reflected beam one of parallel to and perpendicular to the first plane of incidence;
the second reflected beam comprises the one of the s-polarized components and the p-polarized components of the reference and object components in the first reflected beam that are not aligned with the transmission axis of the first polarizer and provides a third output signal comprising interference light reflected from the first polarizer;
the second polarizer is located at the third beam splitting surface;
the third beam splitting surface is located to receive the relative phase-shifted reference and object components in the first transmitted beam;
the third beam splitting surface is configured to partially transmit and partially reflect the relative phase-shifted reference and object components in the first transmitted beam to provide a third reflected beam;
the third beam splitting surface is oriented to reflect the third reflected beam one of parallel to and perpendicular to the first plane of incidence;
the third reflected beam comprises the one of the s-polarized components and the p-polarized components of the reference and object components in the phase-shifted first transmitted beam that are not aligned with the transmission axis of the second polarizer and provides a fourth output signal comprising interference light reflected from the second polarizer at the third beam splitting surface;
the first output signal comprises transmitted interference light components having a first phase difference, the second output signal comprises transmitted interference light components having a second phase difference that differs from the first phase difference by nominally 90 degrees, the third output signal comprises reflected interference light components having a third phase difference that differs from the first phase difference by nominally 180 degrees, and the fourth output signal comprises reflected interference light components having a fourth phase difference that differs from the second phase difference by nominally 180 degrees; and
a relationship between the first, second, third and fourth output signals is indicative of the phase difference between the orthogonal, linearly polarized reference and object components in the input beam.

14. The detector of claim 1, comprising a second beam splitting surface, a third polarizer, and a second phase-shifting element, wherein:
the first polarizer is oriented with a transmission axis thereof aligned with one of the s-polarized components and the p-polarized components of the reference and object components in the first reflected beam and is configured to provide the first output signal, which comprises interference light transmitted through the first polarizer;
the first phase-shifting element is arranged along the first transmitted beam path between the first beam splitting surface and the second beam splitting surface and is configured to transmit reference and object components in the first transmitted beam such that they are phase shifted relative to one another by a first phase shift amount of 120 degrees;
the second beam splitting surface is non-polarizing and is located to receive the reference and object components in the transmitted beam from the first phase shifting element;
the second beam splitting surface is configured to partially transmit and partially reflect the received reference and object components in the first transmitted beam from the first phase shifting element to provide a second reflected beam including relative phase-shifted reference and object components that each include s-polarized components and the p-polarized components;
the second beam splitting surface is oriented to reflect the second reflected beam one of parallel to and perpendicular to the first plane of incidence;
the third polarizer is arranged along the second reflected beam and is oriented with a transmission axis thereof aligned with one of the s-polarized components and the p-polarized components of the relative phase-shifted reference and object components in the second reflected beam to provide a third output signal, which comprises interference light transmitted through the third polarizer;
the second phase-shifting element is arranged along the first transmitted beam path between the second beam splitting surface and the second polarizer to receive the first transmitted beam that is partially transmitted by the second beam splitting surface, and is configured to transmit the reference and object components in the first transmitted beam such that they are phase shifted relative to one another by a second phase shift amount that differs by 120 degrees from the first phase shift amount;

the second polarizer is arranged along the first transmitted beam path to receive the reference and object components in the first transmitted beam from the second phase-shifting element;

the second polarizer is oriented with a transmission axis thereof aligned with one of the s-polarized components and the p-polarized components of the reference and object components in the first transmitted beam received from the second chase-shifting element to provide the second output signal, which comprises interference light transmitted through the second polarizer;

the first output signal comprises transmitted interference light components having a first phase difference, the second output signal comprises transmitted interference light components having a second phase difference that differs from the first phase difference by nominally 120 degrees, and the third output signal comprises transmitted interference light components having a third phase difference that differs from each of the first and second phase differences by nominally 120 degrees; and a relationship between the first, second, and third output signals is indicative of the phase difference between the orthogonal, linearly polarized reference and object components in the input beam.

15. A method for providing signals indicative of a phase difference between orthogonal, linearly polarized reference and object components of an interferometric measurement beam, the method comprising:

providing a detector comprising at least a first beam splitting surface that is non-polarizing, at least first and second polarizers, and at least a first phase-shifting element;

inputting the orthogonal, linearly polarized reference and object components of the interferometric measurement beam as an input beam incident on the first beam splitting surface that is non-polarizing and outputting a first transmitted beam along a first transmitted beam path and a first reflected beam along a first reflected beam path from that first beam splitting surface, wherein the orthogonal, linearly polarized reference and object components of the interferometric measurement beam are oriented such that polarization directions of the orthogonal, linearly polarized reference and object components form equal angles with a first plane of incidence defined by the input beam and a vector normal to the first beam splitting surface at a point of incidence, of the input beam, such that reference and object components included in the first transmitted beam and the first reflected beams each include s-polarized components and p-polarized components defined with reference to the first plane of incidence;

providing a phase-shift between the reference and object components by using the first phase-shifting element in one of the first transmitted beam and the first reflected beam, obtaining a first output signal derived from the first reflected beam by using the first polarizer to receive the reference and object components included in the first reflected beam and to transmit and output interfering components of the reference and object components included in the first reflected beam, including orienting a transmission axis of the first polarizer such that its output interfering components are nominally exclusively one of the p-polarized components and the s-polarized components defined with reference to the first plane of incidence; and obtaining a second output signal derived from the first transmitted beam by using the second polarizer to receive the reference and object components included in the first transmitted beam and to transmit and output interfering components of the reference and object components included in the first transmitted beam, including orienting a transmission axis of the second polarizer such that its output interfering components are nominally exclusively one of the p-polarized components and the s-polarized components defined with reference to the first plane of incidence, wherein a relationship between at least the first and second output signals is indicative of the phase difference between the orthogonal, linearly polarized reference and object components of the input beam.

16. The method of claim 15, wherein the provided detector further comprises:

a number of respective differential phase shift compensating elements corresponding to a number of respective phase-shifting elements included in the detector, wherein each respective differential phase shift compensating element comprises one of a coating element integrated at a respective non-polarizing beam splitting surface and a birefringent element located to receive the p-polarized and s-polarized components in one of a transmitted beam and a reflected beam output by a respective non-polarizing beam splitting surface, and the method further comprises:

passing any p-polarized and s-polarized components that are output by a respective non-polarizing beam splitting surface and that are to be input to a respective phase-shifting element, through a respective differential phase shift compensating element before passing them through the respective phase-shifting element; and adjusting a differential phase shift between the p-polarized and s-polarized components that are output by the respective non-polarizing beam splitting surface, by using the differential phase shift compensating element, wherein the differential phase shift is adjusted to be at most +/−15 degrees to provide nominally orthogonal, linearly polarized reference and object components that are input to the respective phase-shifting element.

17. The method of claim 16, wherein each respective differential phase shift compensating element comprises a coating element at a respective non-polarizing beam splitting surface, the coating element being configured to adjust a differential phase shift of the beam splitting surface in transmission, the method further comprising:

locating each respective phase-shifting element to receive nominally orthogonal, linearly polarized object and reference beam components output in a transmitted beam from a respective non-polarizing beam splitting surface.

18. The method of claim 17 wherein adjusting the differential phase shift comprises adjusting the differential phase shift to be at most +/−5 degrees.

19. The method of claim 16, wherein:

the first output signal comprises the interfering components that are transmitted and output by
the first polarizer;

providing a phase-shift between the reference and object components comprises passing the first transmitted beam through the first phase-shifting element such that the first transmitted beam includes reference and object components that are phase shifted relative to one another by a phase shift amount determined by the first phase-shifting element, before receiving the first transmitted beam using the second polarizer;

the second output signal comprises the interfering components that are transmitted and output by the second polarizer.

20. The method of claim 19, wherein the phase shift amount determined by the first phase-shifting element is nominally 90 degrees of phase shift.

21. The method of claim 20, wherein:
the provided detector further comprises a second beam splitting surface that is positioned along the first reflected beam path and a third beam splitting surface that is positioned along the first transmitted beam path, the first polarizer is located at the second beam splitting surface,
the second beam splitting surface is oriented to reflect the second reflected beam one of parallel to and perpendicular to the first plane of incidence,
the second polarizer is located at the third beam splitting surface, and
the third beam splitting surface is oriented to reflect the second reflected beam one of parallel to and perpendicular to the first plane of incidence; and
the method further comprises:
using the second beam splitting surface to partially transmit and partially reflect the first reflected beam, to provide a second reflected beam;
receiving the first reflected beam using the first polarizer at the second beam splitting surface, such that the provided second reflected beam comprises reflected interfering components of the reference and object components included in the first reflected beam, those reflected interfering components comprising -the one of the s-polarized components and the p-polarized components of the reference and object components in the first reflected beam that are not aligned with the transmission axis of the first polarizer;
obtaining a third output signal comprising the reflected interfering components of the second reflected beam;
using the third beam splitting surface to partially transmit and partially reflect the first transmitted beam including the reference and object components that are phase shifted relative to one another, to provide a third reflected beam;
receiving the first transmitted beam including the reference and object components that are phase shifted relative to one another using the second polarizer at the third beam spitting face surface, such that the provided third reflected beam comprises reflected interfering components of the reference and object components that are phase shifted relative to one another in the first transmitted beam, those reflected interfering components comprising the one of the s-polarized components and the p-polarized components of the reference and object components that are phase shifted relative to one another in the first transmitted beam that are not aligned with the transmission axis of the second polarizer; and
obtaining a fourth output signal comprising the reflected interfering components of the third reflected beam, wherein:
the first output signal comprises transmitted interfering components having a first phase difference, the second output signal comprises transmitted interfering components having a second phase difference that differs from the first phase difference by nominally 90 degrees, the third output signal comprises reflected interfering components having a third phase difference that differs from the first phase difference by nominally 180 degrees, and the fourth output signal comprises reflected interfering components having a fourth phase difference that differs from the second phase difference by nominally 180 degrees, and
a relationship between the first, second, third and fourth output signals is indicative of the phase difference between the orthogonal, linearly polarized reference and object components of the input beam.

22. The method of claim 15, wherein:
the first output signal comprises the interfering components that are transmitted and output by
the first polarizer; providing a phase-shift between the reference and object components comprises
passing the first transmitted beam through the first phase-shifting element such that the first transmitted beam includes reference and object components that are phase shifted relative to one another by a phase shift amount determined by the first phase-shifting element, before receiving the first transmitted beam using the second polarizer;
the second output signal comprises the interfering components that are transmitted and output by the second polarizer.

23. The method of claim 22, wherein:
the provided detector further comprises a second beam splitting surface that is positioned along the first reflected beam path and a third beam splitting surface that is positioned along the first transmitted beam path, the first polarizer is located at the second beam splitting surface,
the second beam splitting surface is oriented to reflect the second reflected beam one of parallel to and perpendicular to the first plane of incidence,
the second polarizer is located at the third beam splitting surface, and
the third beam splitting surface is oriented to reflect the second reflected beam one of parallel to and perpendicular to the first plane of incidence, and the method further comprises:
using the second beam splitting surface to partially transmit and partially reflect the first reflected beam, to provide a second reflected beam;
receiving the first reflected beam using the first polarizer at the second beam spitting surface, such that the provided second reflected beam comprises reflected interfering components of the reference and object components included in the first reflected beam, those reflected interfering components comprising the one of the s-polarized components and the p-polarized components of the reference and object components in the first reflected beam that are not aligned with the transmission axis of the first polarizer;
obtaining a third output signal comprising the reflected interfering components of the second reflected beam;
using the third beam splitting surface to partially transmit and partially reflect the first transmitted beam including the reference and object components that are phase shifted relative to one another, to provide a third reflected beam;

receiving the first transmitted beam including the reference and object components that are phase shifted relative to one another using the second polarizer at the third beam spitting surface, such that the provided third reflected beam comprises reflected interfering components of the reference and object components that are phase shifted relative to one another in the first transmitted beam, those reflected interfering components comprising the one of the s-polarized components and the p-polarized components of the reference and object components that are phase shifted relative to one another in the first transmitted beam that are not aligned with the transmission axis of the second polarizer; and obtaining a fourth output signal comprising the reflected interfering components of the third reflected beam, wherein:

the first output signal comprises transmitted interfering components having a first phase difference, the second output signal comprises transmitted interfering components having a second phase difference that differs from the first phase difference by nominally 90 degrees, the third output signal comprises reflected interfering components having a third phase difference that differs from the first phase difference by nominally 180 degrees, and the fourth output signal comprises reflected interfering components having a fourth phase difference that differs from the second phase difference by nominally 180 degrees; and a relationship between the first, second, third and fourth output signals is indicative of the phase difference between the orthogonal, linearly polarized reference and object components of the input beam.

* * * * *